US011175666B2

(12) United States Patent
Fairfield et al.

(10) Patent No.: US 11,175,666 B2
(45) Date of Patent: Nov. 16, 2021

(54) ARRANGING PASSENGER PICKUPS FOR AUTONOMOUS VEHICLES

(71) Applicant: Waymo LLC, Mountain View, CA (US)

(72) Inventors: Nathaniel Fairfield, Mountain View, CA (US); Joshua Seth Herbach, San Francisco, CA (US); Christopher Kennedy Ludwick, Mountain View, CA (US); Matthew Paul McNaughton, Sunnyvale, CA (US); Renaud-Roland Hubert, Gilroy, CA (US); Jennifer Arden, Tiburon, CA (US); Min Li Chan, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 16/775,882

(22) Filed: Jan. 29, 2020

(65) Prior Publication Data
US 2020/0192385 A1  Jun. 18, 2020

Related U.S. Application Data

(63) Continuation of application No. 15/728,954, filed on Oct. 10, 2017, now Pat. No. 10,591,916, which is a
(Continued)

(51) Int. Cl.
*G05D 1/02* (2020.01)
*H04W 4/029* (2018.01)
(Continued)

(52) U.S. Cl.
CPC ......... *G05D 1/0212* (2013.01); *G05D 1/0088* (2013.01); *G06Q 10/02* (2013.01);
(Continued)

(58) Field of Classification Search
None
See application file for complete search history.

(56) References Cited

U.S. PATENT DOCUMENTS 8,793,036 B2   7/2014 Koon et al.
8,880,270 B1  11/2014 Ferguson et al.
(Continued)

FOREIGN PATENT DOCUMENTS

JP   H10208195 A   8/1998
JP   2000194417 A   7/2000
(Continued)

OTHER PUBLICATIONS

Japanese Decision to Grant for Japanese Patent Application No. 2018-544552 dated Aug. 31, 2020.
(Continued)

*Primary Examiner* — Tamara L Weber
(74) *Attorney, Agent, or Firm* — Botos Churchill IP Law

(57) ABSTRACT

Aspects of the disclosure relate to arranging a pickup between a driverless vehicle and a passenger. For instance, dispatch instructions dispatching the vehicle to a predetermined pickup area in order to pick up the passenger are received by the vehicle which begins maneuvering to the predetermined pickup area. While doing so, the vehicle receives from the passenger's client computing device the device's location. An indication that the passenger is interested in a fly-by pickup is identified. The fly-by pickup allows the passenger to safely enter the vehicle at a location outside of the predetermined pickup area and prior to the one or more processors have maneuvered the vehicle to the predetermined pickup area. The vehicle determines that the fly-by pickup is appropriate based on at least the location of
(Continued)

the client computing device and the indication, and based on the determination, maneuvers itself in order to attempt the fly-by pickup.

19 Claims, 13 Drawing Sheets

Related U.S. Application Data continuation of application No. 15/079,591, filed on Mar. 24, 2016, now Pat. No. 9,836,057.

(51) Int. Cl.
    *G06Q 10/02*     (2012.01)
    *G08G 1/005*     (2006.01)
    *G08G 1/00*     (2006.01)
    *G06Q 50/30*     (2012.01)
    *G05D 1/00*     (2006.01)

(52) U.S. Cl.
    CPC .............. *G06Q 50/30* (2013.01); *G08G 1/005* (2013.01); *G08G 1/202* (2013.01); *H04W 4/029* (2018.02)

(56) References Cited

U.S. PATENT DOCUMENTS

| | | | |
|---|---|---|---|
| 9,157,748 | B2 | 10/2015 | Millspaugh |
| 9,507,346 | B1 | 11/2016 | Levinson et al. |
| 2012/0041675 | A1 | 2/2012 | Juliver et al. |
| 2014/0039784 | A1 | 2/2014 | Millspaugh |
| 2014/0067488 | A1 | 3/2014 | James et al. |
| 2014/0300449 | A1 | 10/2014 | Kounavis |
| 2015/0006005 | A1 | 1/2015 | Yu et al. |
| 2015/0081362 | A1 | 3/2015 | Chadwick et al. |
| 2015/0337587 | A1 | 11/2015 | Lu et al. |
| 2015/0339928 | A1 | 11/2015 | Ramanujam |
| 2015/0369621 | A1 | 12/2015 | Abhyanker |
| 2015/0377635 | A1 | 12/2015 | Beaurepaire et al. |
| 2016/0006922 | A1 | 1/2016 | Boudreau et al. |
| 2016/0116293 | A1 | 4/2016 | Grover et al. |
| 2016/0127486 | A1 | 5/2016 | Chen et al. |
| 2016/0203576 | A1 | 7/2016 | Novak |
| 2016/0247113 | A1 | 8/2016 | Rademaker |
| 2016/0255472 | A1 | 9/2016 | Wise |
| 2017/0115125 | A1 | 4/2017 | Outwater et al. |
| 2017/0160092 | A1* | 6/2017 | Botea ................ G01C 21/3691 |

FOREIGN PATENT DOCUMENTS

| | | |
|---|---|---|
| JP | 2002032897 A | 1/2002 |
| JP | 2005044089 A | 2/2005 |
| JP | 2006308390 A | 11/2006 |
| JP | 2010146354 A | 7/2010 |
| JP | 2012014482 A | 1/2012 |
| JP | 2012225792 A | 11/2012 |
| JP | 2014041267 A | 3/2014 |
| JP | 2014041604 A | 3/2014 |
| JP | 2015191264 A | 11/2015 |
| KR | 20130035960 A | 4/2013 |

OTHER PUBLICATIONS

Examination Report No. 2 in AU Application No. 2017238151, dated Sep. 17, 2019 3 pages.
Office Action in JP Application No. 2018-544552, dated Nov. 27, 2019—with English translation (9 pages).
"Canadian Office Action issued in Application No. 3,018,184 dated Sep. 9, 2019", 9 pages.
"Examination Report No. 1 for AU Application No. 2017238151 dated Jun. 22, 2019", 5 pages.
"Extended European Search Report for Application No. 17771078. 7, dated Sep. 9, 2019", 11 pages.
"International Preliminary Report on Patentability for Application No. PCT/US2017/023628, dated Oct. 4, 2018", 10 pages.
"International Search Report and Written Opinion for PCT Application No. PCT/US2017/023628, dated Jun. 16, 2017", 13 pages.
"Notice of Preliminary Rejection for Korean Application No. 10-2018-7027019, dated Aug. 21, 2019", 12 pages (with English Translation).
"Search Report and Written Opinion for Singapore Application No. 11201807029P dated Jul. 15, 2019", 6 pages.
Accessible Pedestrian Signals:, A Guide To Best Practices , "Criteria for WALK Indications", Chapter 4: Features of APS, available at <http://www.apaguide.org/chapter4_walkindication.cfm>, retrieved on Mar. 2, 2016, 5 pages.
Fagnant , et al., "Operations of a Shared Autonomous Vehicle Fleet for the Austin, Texas Market", To be presented at the 94th Annual Meeting of the Transportation Research Board in Washington DC and under review for publication in Transportation Research Record, 2015, 17 pages.
Rogers, Greg , "AVision: Rideshare and Autonomous Vehicles", Available at <http://www.theautonomer.com/news-and-updated/2015/9/3/avision-rideshare-and-autonomous-vehicles>, retrieved on Jan. 4, 2016, 16 pages.
Republic of Korea Office Action for Application No. 10-2020-7013390 dated Dec. 30, 2020.

\* cited by examiner

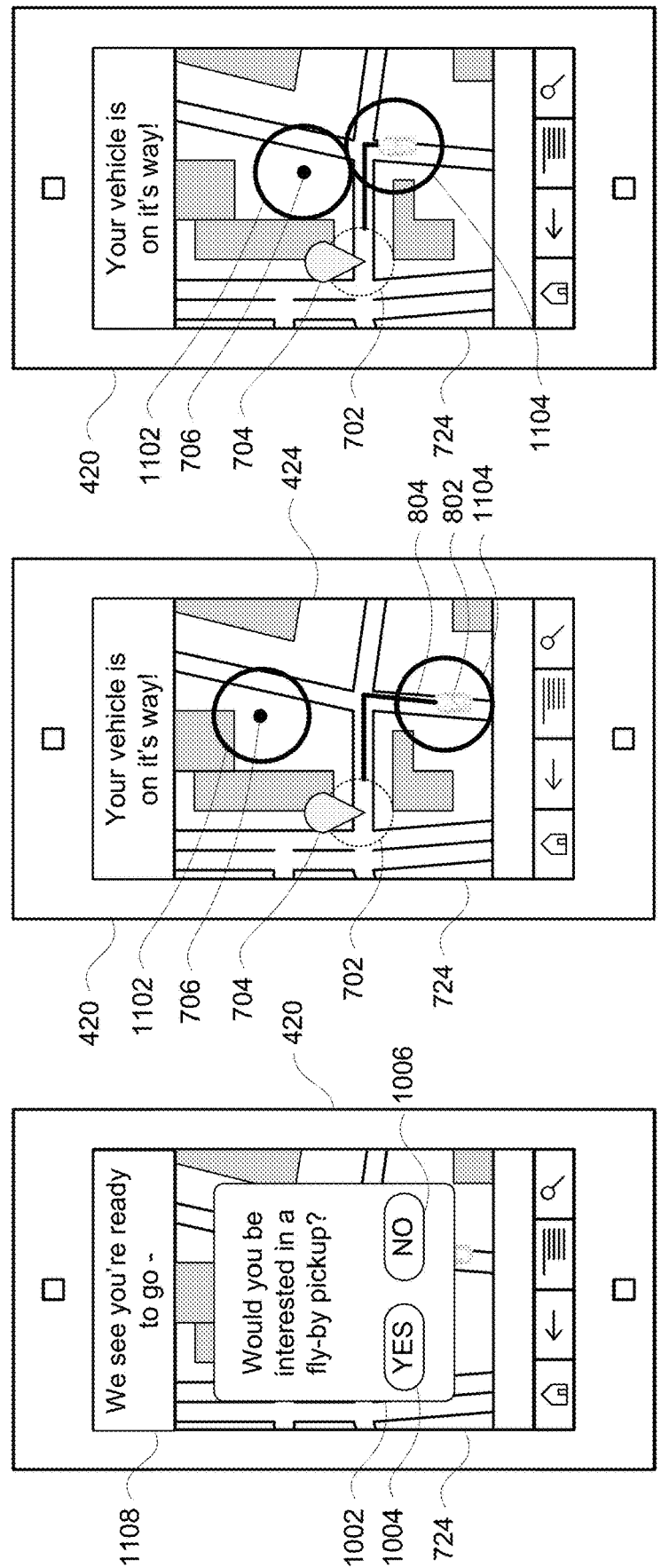

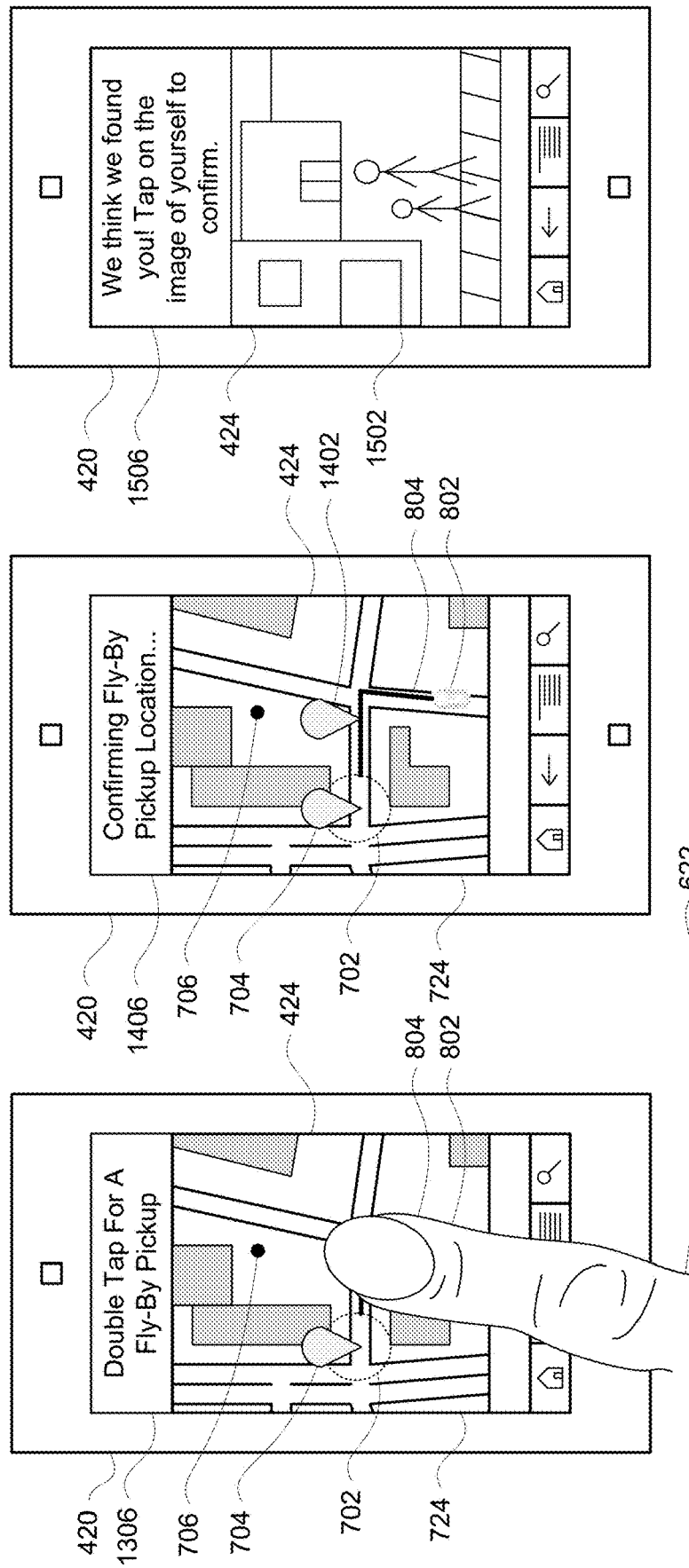

ARRANGING PASSENGER PICKUPS FOR AUTONOMOUS VEHICLES

CROSS-REFERENCE TO RELATED APPLICATIONS

The present application is a continuation of U.S. patent application Ser. No. 15/728,954, filed Oct. 10, 2017, which is a continuation of U.S. patent application Ser. No. 15/079,591, filed Mar. 24, 2016, now issued as U.S. Pat. No. 9,836,057 on Dec. 5, 2017, the disclosures of which are incorporated herein by reference.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location.

When a person (or user) wants to be physically transported between two locations via a vehicle, they may use any number of taxi services. To date, these services typically involve a human driver who is given dispatch instructions to a location to pick up the user. These services, while useful, generally fail to provide users with real time information about what actions a taxi is taking on the way to pick up the user.

BRIEF SUMMARY

One aspect of the disclosure provides a method for arranging a pickup between a driverless vehicle and a passenger. The method includes receiving, by one or more processors, dispatch instructions dispatching the vehicle to a predetermined pickup area in order to pick up the passenger; maneuvering, by the one or more processors, the vehicle towards the predetermined pickup area to pick up the passenger; while maneuvering, receiving, by the one or more processors from the client computing device associated with the passenger, a location of the client computing device; and identifying an indication that the passenger is interested in a fly-by pickup in real time. A fly-by pickup allows the passenger to safely enter the vehicle at a location outside of the predetermined pickup area and prior to the one or more processors have maneuvered the vehicle to the predetermined pickup area. The method also includes determining, by the one or more processors, that the fly-by pickup is appropriate based on at least the location of the client computing device and the indication, and based on the determination, further maneuvering the vehicle, by the one or more processors, in order to attempt the fly-by pickup.

In one example, the indication includes receiving, from the client computing device, information indicating that the passenger is waiting by a curb outside of the predetermined pickup area. In another example, the method also includes sending, by the one or more processors, a request to the client computing device for confirmation that the passenger is interested in attempting the fly-by pickup, and receiving, by the one or more processors, user input indicating that the passenger is interested in attempting the fly-by pickup, and the indication includes the received user input. In another example, the method also includes receiving, from a perception system of the vehicle, sensor data indicating that the passenger has performed a task, and the indication includes the sensor data indicating that the passenger has performed the task. In this example, the task includes capturing an image of the passenger's surroundings and sending the image to the vehicle, and the method further comprises using the image to attempt the fly-by pickup. In addition or alternatively, the task includes providing a verbal description of the passenger, and the method further comprises using the verbal description of the passenger to attempt the fly-by pickup. In addition or alternatively, the task includes playing a sound through a speaker of the client computing device, and the method further comprises using, by the one or more processors, the sound to maneuver the vehicle towards the passenger in order to attempt the fly-by pickup. In addition or alternatively, the task includes walking towards the vehicle, and the method further comprises stopping, by the one or more processors, in order to allow the passenger to enter the vehicle. In another example, the method also includes capturing, by a camera of the vehicle, an image of the passenger, and sending, by the one or more processors, the image of the passenger to the passenger in order to indicate that the vehicle has identified the passenger as being nearby the vehicle. In this example, the image of the passenger is sent to the client computing device as part of the request. In another example, the method also includes receiving, by the one or more processors from the client computing device, information indicating that the passenger is currently walking, and the indication includes the received information indicating that the passenger is currently walking. In another example, the method also includes retrieving, by the one or more processors, historical information for the passenger indicating that the passenger has successfully achieved at least one fly-by pickup in the past, and wherein the determining is further based on the historical information. In another example, the method also includes retrieving, by the one or more processors, historical information for the passenger indicating that the passenger has not successfully achieved at least one fly-by pickup in the past, and wherein the determining is further based on the historical information.

Another aspect of the disclosure provides a method for arranging a pickup between a driverless vehicle and a passenger. The method includes sending, by one or more processors of a client computing device associated with the passenger, a request for the vehicle to pick up the passenger at a pickup area; receiving, by the one or more processors, confirmation that the vehicle has been dispatched to the pickup area; receiving after the vehicle has been dispatched, by the one or more processors, location information identifying a location of the vehicle as the vehicle is moving towards the pickup area; displaying, by the one or more processors on a display of the client computing device, the location of the vehicle and a location of the client computing device on a map; and identifying, by the one or more processors, an indication that the passenger is interested in a fly-by pickup in real time. The fly-by pickup allows the passenger to safely enter the vehicle at a location outside of the pickup area and prior to the vehicle having reached the predetermined pickup area. The method also includes sending, by the one or more processors, the indication to a computing device associated with the vehicle; receiving, by the one or more processors, confirmation that the vehicle will attempt the fly-by pickup; and displaying on the display, by the one or more processors, a notification indicating to the passenger that the vehicle will attempt the fly-by pickup based on the received confirmation.

In one example, the method also includes receiving user input indicating a tap at a location on the map, and wherein the indication includes a location on the map that corresponds to the user input, such that the location on the map is sent to the computing device associated with the vehicle. In another example, the computing device is incorporated into the vehicle. In another example, displaying the location of the vehicle includes displaying a first indicator on the map and displaying the location of the client computing device includes displaying a second indicator on the map. In this example, the method also includes receiving, by the one or more processors, updated location information for the vehicle; determining, by the one or more processors, updated location information for the client computing device using a sensor of the client computing device; moving the first and second indicators on the map based on the updated location information. In addition, the method also includes when edges of the first and second indicators are moved to contact one another, displaying a notification on the display indicating that the passenger is able to attempt the fly-by pickup; and in response to the notification, receiving user input indicating confirmation that the passenger would like to attempt the fly-by pickup. The indication includes the confirmation that the passenger would like to attempt the fly-by pickup. In addition or alternatively, the method also includes receiving, from a sensor of the client computing device, information indicating that the client computing device is currently being moved, and wherein the indication includes the information indicating that the client computing device is currently moving. In addition or alternatively, the method also includes receiving, from the computing device associated with the vehicle, a request for the passenger to perform a task in order to confirm that the passenger would like to attempt the fly-by pickup, wherein the indication includes confirmation that the task has been performed by the passenger.

BRIEF DESCRIPTION OF THE DRAWINGS

FIGS. 6A-15 are various example screen shots and client computing devices in accordance with aspects of the disclosure.

DETAILED DESCRIPTION

Overview

Figure 1:
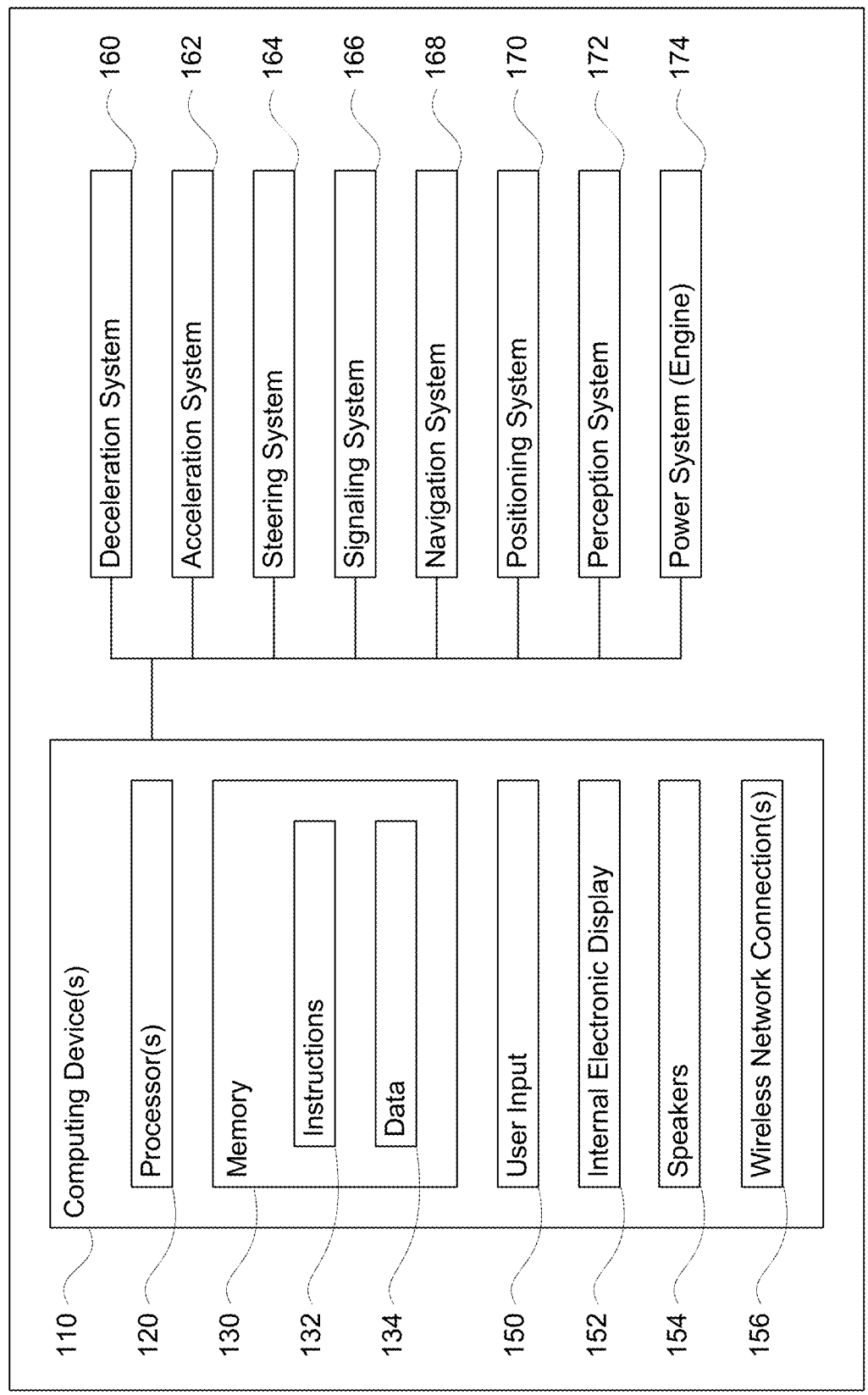
FIG. 1 is a functional diagram of an example vehicle in accordance with aspects of the disclosure.

Passenger pick-up for self-driving vehicles can be challenging due to changing environmental conditions, the absence of a human driver, and uncertainty as to how long a vehicle may have to wait (or is able to wait) for the passenger. For instance, there may be other parked cars, busy traffic, construction, or other obstacles that require the vehicle's computing devices to determine whether stopping at a given location is safe, permissible, or even a possibility.

In addition, without a driver to make eye contact with the passenger and gesture his/her intention to stop at a different location, the passenger can be confused about where to meet up with the vehicle. Moreover, given the changing environmental conditions mentioned above, the user may be uncertain about how long the vehicle may have to wait for the user to arrive and board the vehicle. This could change relatively quickly, for instance, based on whether a vehicle is pulling over on a busy or quiet street.

By increasing the amount of information available to a passenger and facilitating communications between the passenger and the computers of the vehicle, many of the issues discussed above can be addressed. In addition, this may also allow the passenger and vehicle to achieve "fly-by pickups" in real time or pickups at locations other than an original pickup location. A fly-by pickup is a pickup of a passenger that is achieved prior to when the vehicle reaches a predetermined pickup area for the vehicle to pick up the passenger. In other words, after a vehicle is dispatched to a predetermined pickup location or area in order to pick up a passenger, a new pickup location or area is identified for the passenger and the vehicle. If a fly-by pickup is successful, the passenger is safely picked up at the new pickup location or area by the vehicle. This new pickup location or area is outside of the predetermined pickup area. As such, a fly-by pickup may be result of last minute change to the pickup location or area for the passenger in view of a better or alternative pickup location or area for the vehicle, the passenger, or both.

In order to achieve the fly-by pickup, information about the vehicle's status may be shared with a potential passenger (or simply passenger). At the same time, information about the passenger's location may be reported to the vehicle. Because of this exchange of information, the vehicle and/or the passenger may attempt or initiate a fly-by pickup.

During a fly-by pickup, rather than pulling into a parking area and waiting for the passenger, the vehicle may simply double park, for instance, stopping in a lane when safe to do so and waiting only a few seconds for the passenger to get into the car, close the door and fasten his or her seatbelt. If this occurs, the fly-by pickup has been successful. If not, the vehicle may have to pull away and continue towards the original pickup location. In some cases, the vehicle and passenger may need to rearrange a new pickup location after an unsuccessful fly-by pickup attempt.

Before actually attempting a fly-by pickup, in addition to the current location of the passenger's client computing device, the vehicle's computing devices may take into consideration current conditions, such as whether it is a busy or quiet street and how disruptive a fly-by pickup might be. Once the vehicle's computing devices have determined that a fly-by pickup is safe given the current and expected (historical) conditions, the vehicle may initiate a fly-by pickup.

When initiated by a vehicle, the fly-by pickup may occur automatically. In this regard, if the passenger's reported location indicates that the passenger is already waiting at a particular spot such as by a curb and therefore likely ready to go, the vehicle can stop at that location. Alternatively, the vehicle may ask the user if he or she is interested in a fly-by-pick-up in real time, for instance by displaying a popup notification with options for the user to select to accept or deny the request to do the fly-by pickup. In some examples, the fly-by pickup notification can be made using visual representations of the relationship between the vehicle and the location of the passenger's client computing device.

A fly-by pickup may also be initiated by the passenger. The user may signal physically to the vehicle that he or she is interested in a fly-by pickup by stepping into the street. Alternatively, the passenger may initiate a fly-by pickup using his or her client computing device.

To achieve a fly-by pickup, the passenger may be asked to perform some task to further facilitate the fly-by pickup. This may include a special gesture, which the vehicle's computing devices could detect either from the laser, camera, the passenger's client computing device, or some combination of the above. In another example, the passenger may be asked to take a picture, hold his or her client computing device in a particular way, walk to a certain location, provide verbal cues, review and provide feedback regarding an image captured by a camera of the vehicle, etc.

In addition to considering the current location of the passenger's client computing device and current and expected conditions, the vehicle's computing devices may also consider the passenger's past history with attempting and achieving fly-by pickups. In some cases, the passenger may be offered discounts, free rides, or other perks in exchange for accepting or initiating a fly-by pickup. This may also be dependent upon whether the fly-by pickup was successful (and the passenger made it into the vehicle).

Fly-by pickups can be extremely helpful to both passengers and vehicles. For instance, a fly-by pickup can save both the vehicle and passenger time and effort to reach the original pickup location. This increases the efficiency of the vehicles and reduces the time needed to find a spot to park, stop and park the vehicle, and to wait for the passenger.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. As an example, data 134 of memory 130 may store predefined scenarios. A given scenario may identify a set of scenario requirements including a type of object, a range of locations of the object relative to the vehicle, as well as other factors such as whether the autonomous vehicle is able to maneuver around the object, whether the object is using a turn signal, the condition of a traffic light relevant to the current location of the object, whether the object is approaching a stop sign, etc. The requirements may include discrete values, such as "right turn signal is on" or "in a right turn only lane", or ranges of values such as "having an heading that is oriented at an angle that is 30 to 60 degrees offset from a current path of vehicle 100." In some examples, the predetermined scenarios may include similar information for multiple objects.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. As an example, internal electronic display 152 may be controlled by a dedicated computing device having its own processor or central processing unit (CPU), memory, etc. which may interface with the computing device 110 via a high-bandwidth or other network connection. In some examples, this computing device may be a user interface computing device which can communicate with a user's client device. Similarly, the memory may be a hard drive or other storage media located in a housing different from that of computing device 110. Accordingly, references to a processor or computing device will be understood to include references to a collection of processors or computing devices or memories that may or may not operate in parallel.

Computing device 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100. In addition to internal speakers, the one or more speakers 154 may include external speakers that are arranged at various locations on the vehicle in order to provide audible notifications to objects external to the vehicle 100.

In one example, computing device 110 may be an autonomous driving computing system incorporated into vehicle 100. The autonomous driving computing system may capable of communicating with various components of the vehicle. For example, returning to FIG. 1, computing device 110 may be in communication with various systems of vehicle 100, such as deceleration system 160 (for controlling braking of the vehicle), acceleration system 162 (for controlling acceleration of the vehicle), steering system 164 (for controlling the orientation of the wheels and direction of the vehicle), signaling system 166 (for controlling turn signals), navigation system 168 (for navigating the vehicle to a location or around objects), positioning system 170 (for determining the position of the vehicle), perception system 172 (for detecting objects in the vehicle's environment), and power system 174 (for example, a battery and/or gas or diesel powered engine) in order to control the movement, speed, etc. of vehicle 100 in accordance with the instructions 134 of memory 130 in an autonomous driving mode which does not require or need continuous or periodic input from a passenger of the vehicle. Again, although these systems are shown as external to computing device 110, in actuality, these systems may also be incorporated into computing device 110, again as an autonomous driving computing system for controlling vehicle 100.

The computing device 110 may control the direction and speed of the vehicle by controlling various components. By way of example, computing device 110 may navigate the vehicle to a destination location completely autonomously using data from the map information and navigation system 168. Computer 110 may use the positioning system 170 to determine the vehicle's location and perception system 172 to detect and respond to objects when needed to reach the location safely. In order to do so, computer 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 162 may be a part of a drivetrain that includes various components between an engine of the vehicle and the wheels of the vehicle. Again, by controlling these systems, computer 110 may also control the drivetrain of the vehicle in order to maneuver the vehicle autonomously.

As an example, computing device 110 may interact with deceleration system 160 and acceleration system 162 in order to control the speed of the vehicle. Similarly, steering system 164 may be used by computing device 110 in order to control the direction of vehicle 100. For example, if vehicle 100 configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 132 may store map information, e.g., highly detailed maps that computing devices 110 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line.

Figure 2:
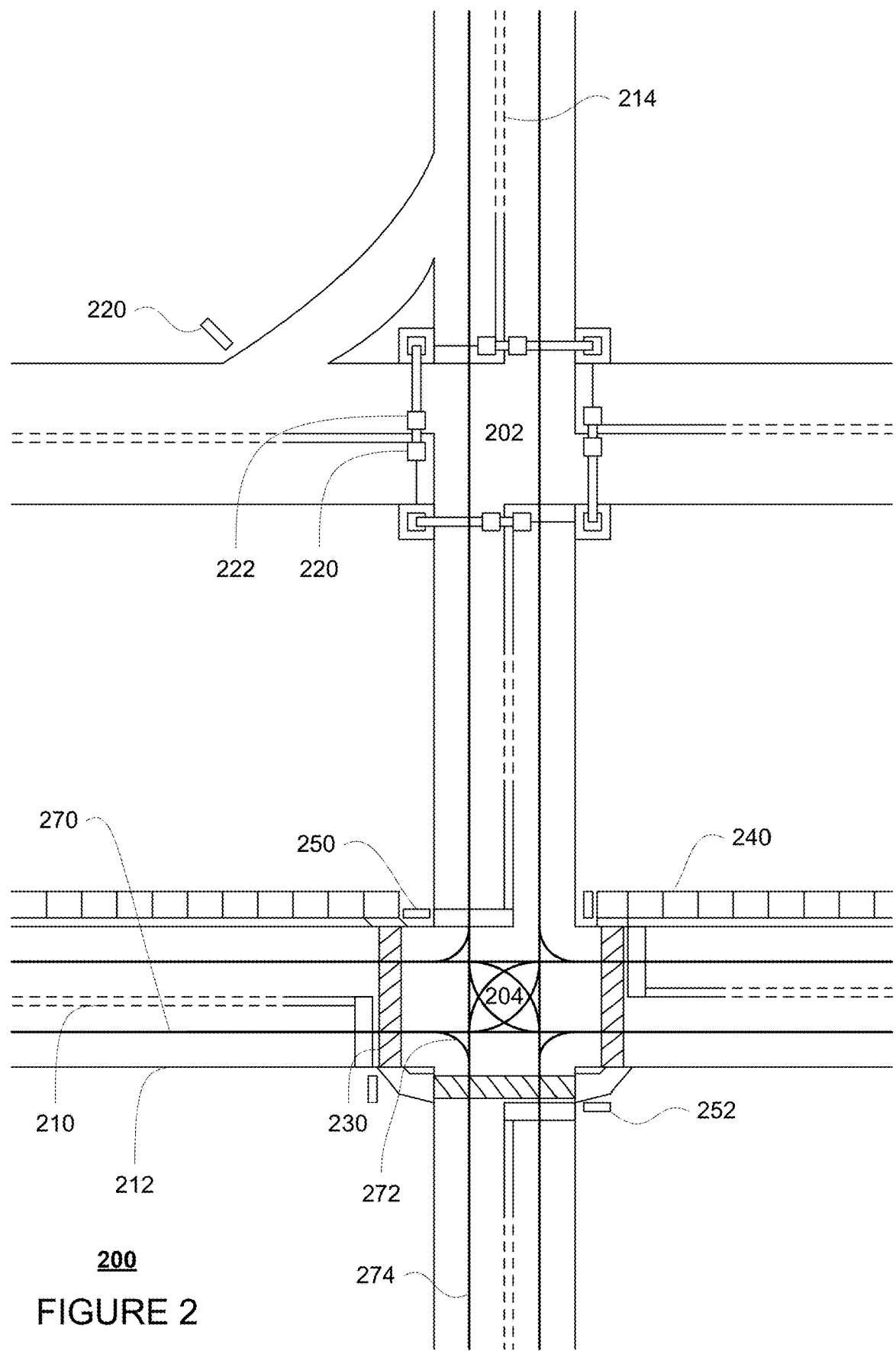
FIG. 2 is an example representation of detailed map information in accordance with aspects of the disclosure.
Figure 3A:
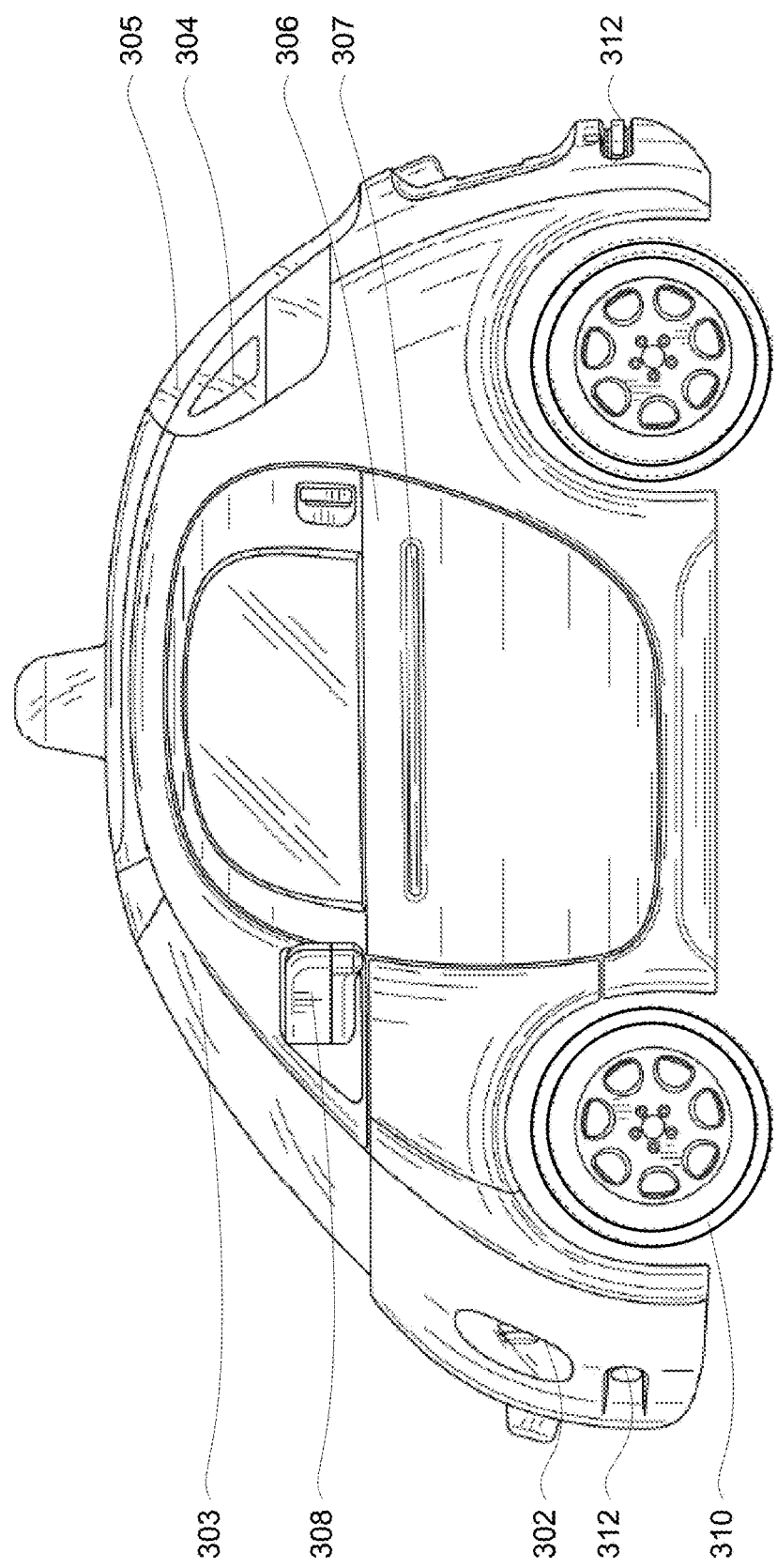
FIGS. 3A-3D are example external views of a vehicle in accordance with aspects of the disclosure.
Figure 3C:
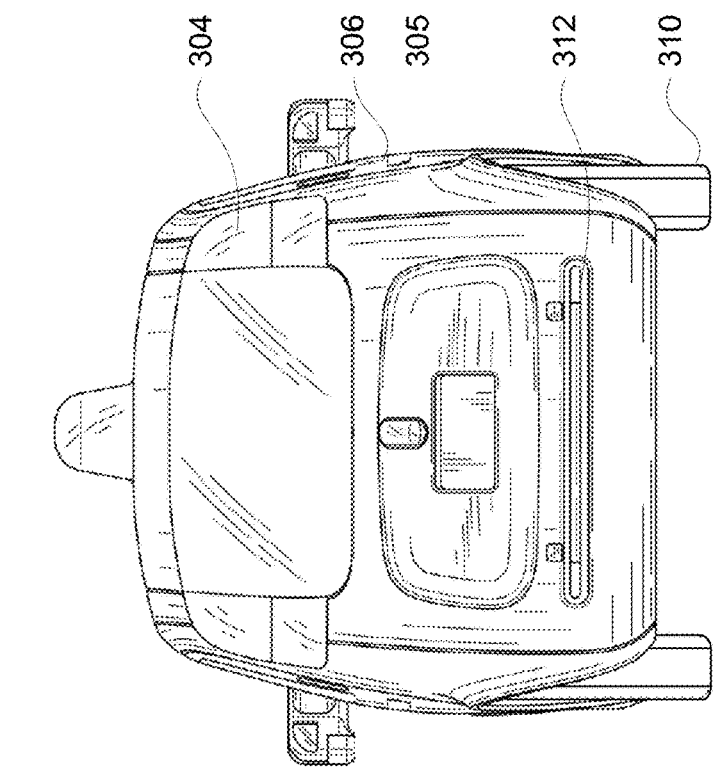
Figure 3B:
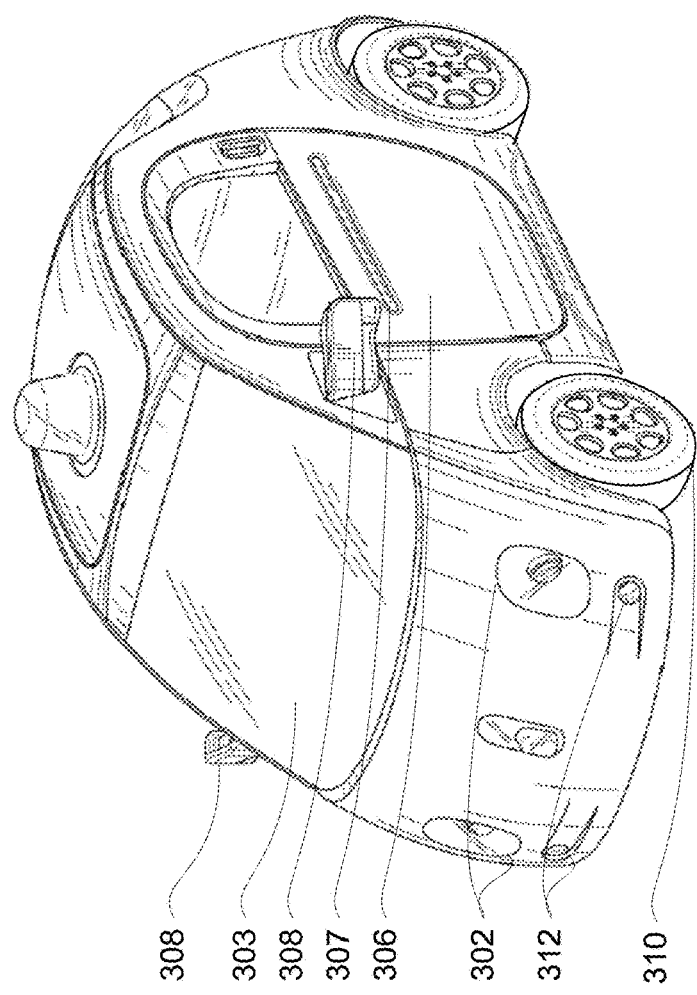
Figure 3D:
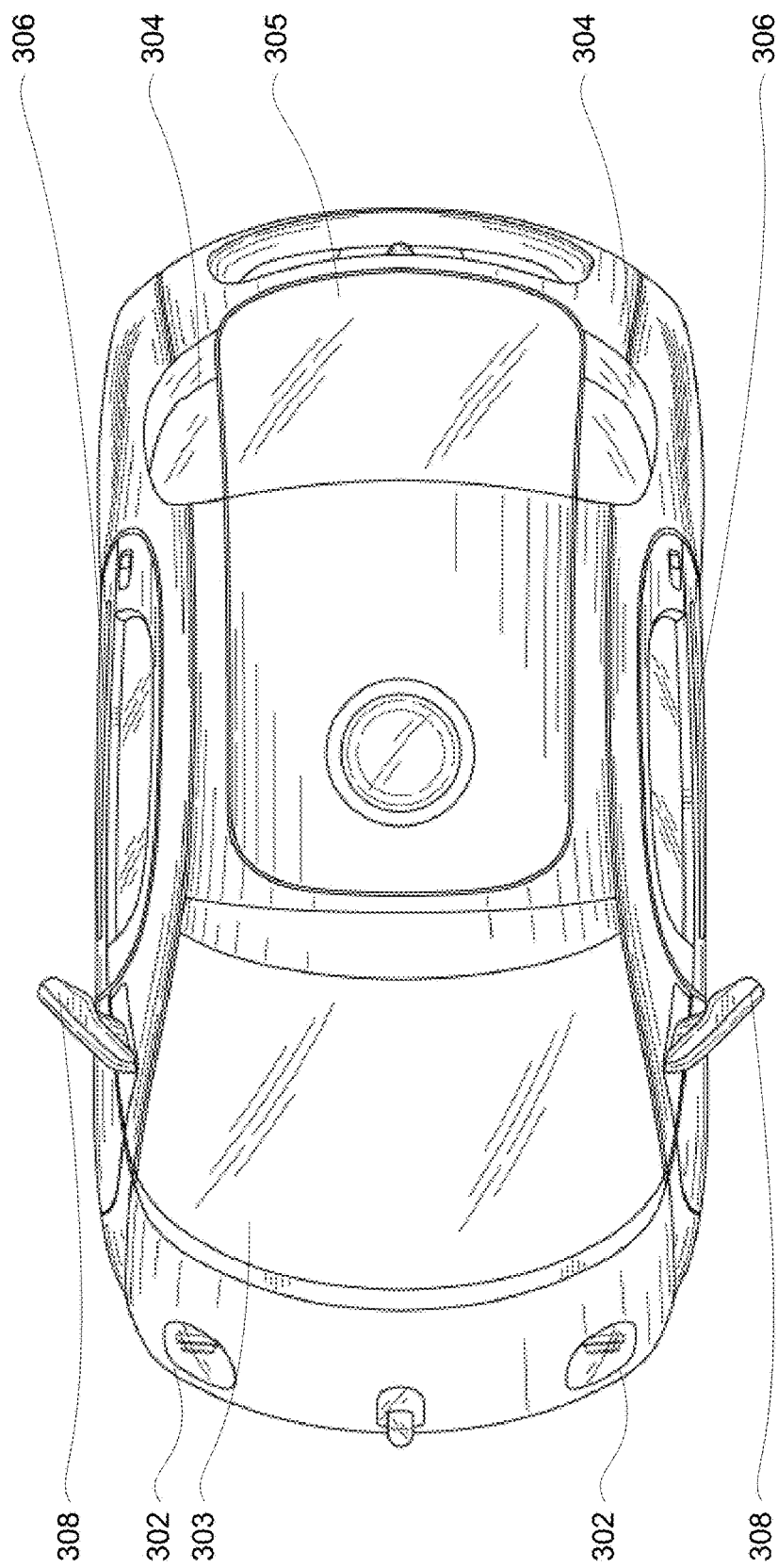

FIG. 2 is an example of map information 200 for a section of roadway including intersections 202 and 204. In this example, the map information 200 includes information identifying the shape, location, and other characteristics of lane lines 210, 212, 214, traffic signal lights 220, 222, crosswalks 230, 232, sidewalks 240, stop signs 250, 252, and yield sign 260. Areas where the vehicle can drive may be associated with one or more rails 270, 272, and 274 which indicate the location and direction in which a vehicle should generally travel at various locations in the map information. For example, a vehicle may follow rail 270 when driving in the lane between lane lines 210 and 212, and may transition to rail 272 in order to make a right turn at intersection 204. Thereafter the vehicle may follow rail 274. Of course, given the number and nature of the rails only a few are depicted in map information 200 for simplicity and ease of understanding. Although not shown, the detailed map information may also include historical information identifying typical and historical traffic conditions at various dates and times.

Although the detailed map information is depicted herein as an image-based map, the map information need not be entirely image based (for example, raster). For example, the detailed map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

FIGS. 3A-3D are examples of external views of vehicle 100. As can be seen, vehicle 100 includes many features of a typical vehicle such as headlights 302, windshield 303, taillights/turn signal lights 304, rear windshield 305, doors 306, side view mirrors 308, tires and wheels 310, and turn signal/parking lights 312. Headlights 302, taillights/turn signal lights 304, and turn signal/parking lights 312 may be associated the signaling system 166. Light bar 307 may also be associated with the signaling system 166. As noted above, vehicle 100 may include various speakers 314 arranged on the external surfaces of the vehicle corresponding to the one or more speakers 154 as noted above.

Figure 4:
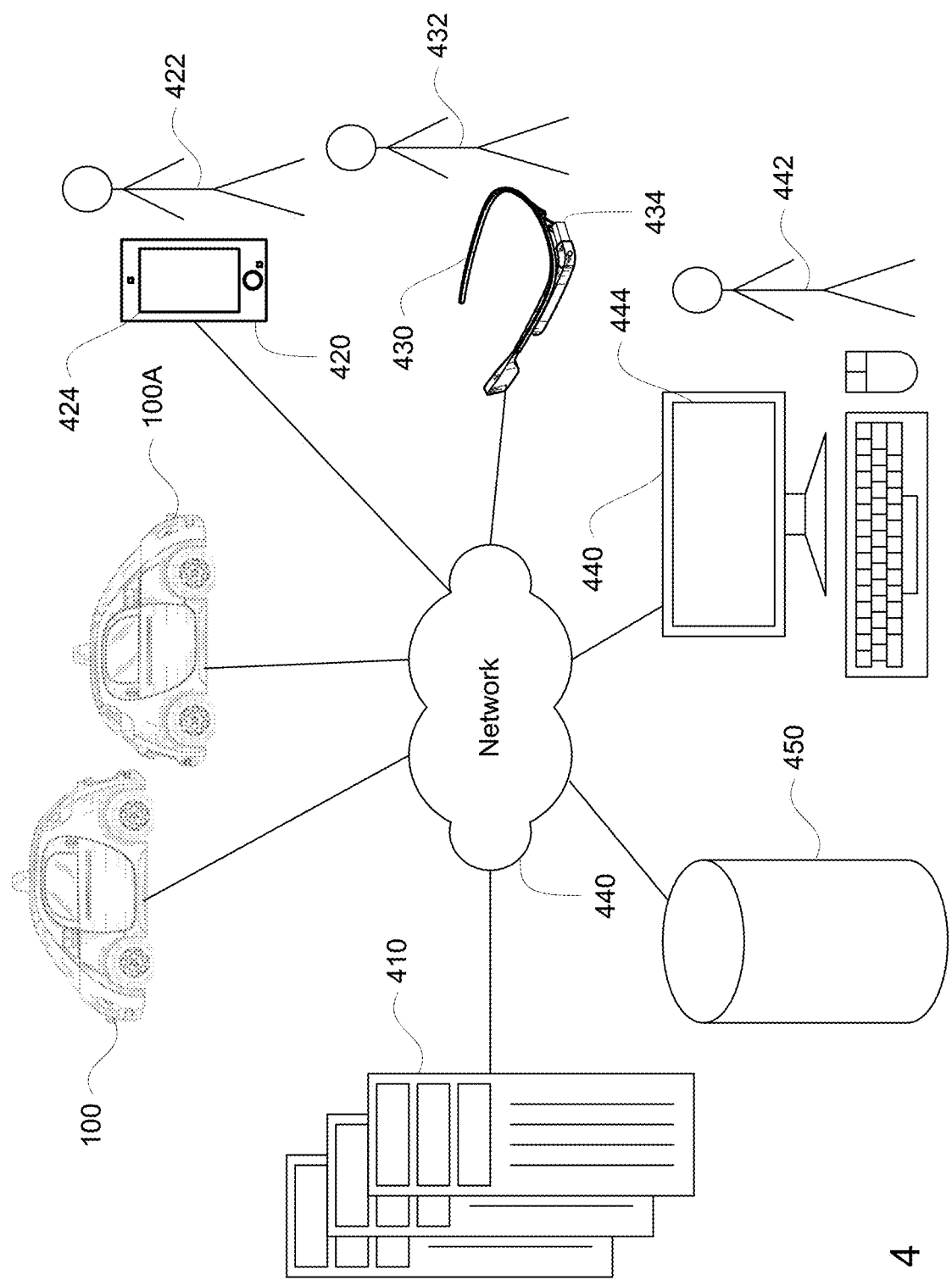
FIG. 4 is a pictorial diagram of a system in accordance with aspects of the disclosure.
Figure 5:
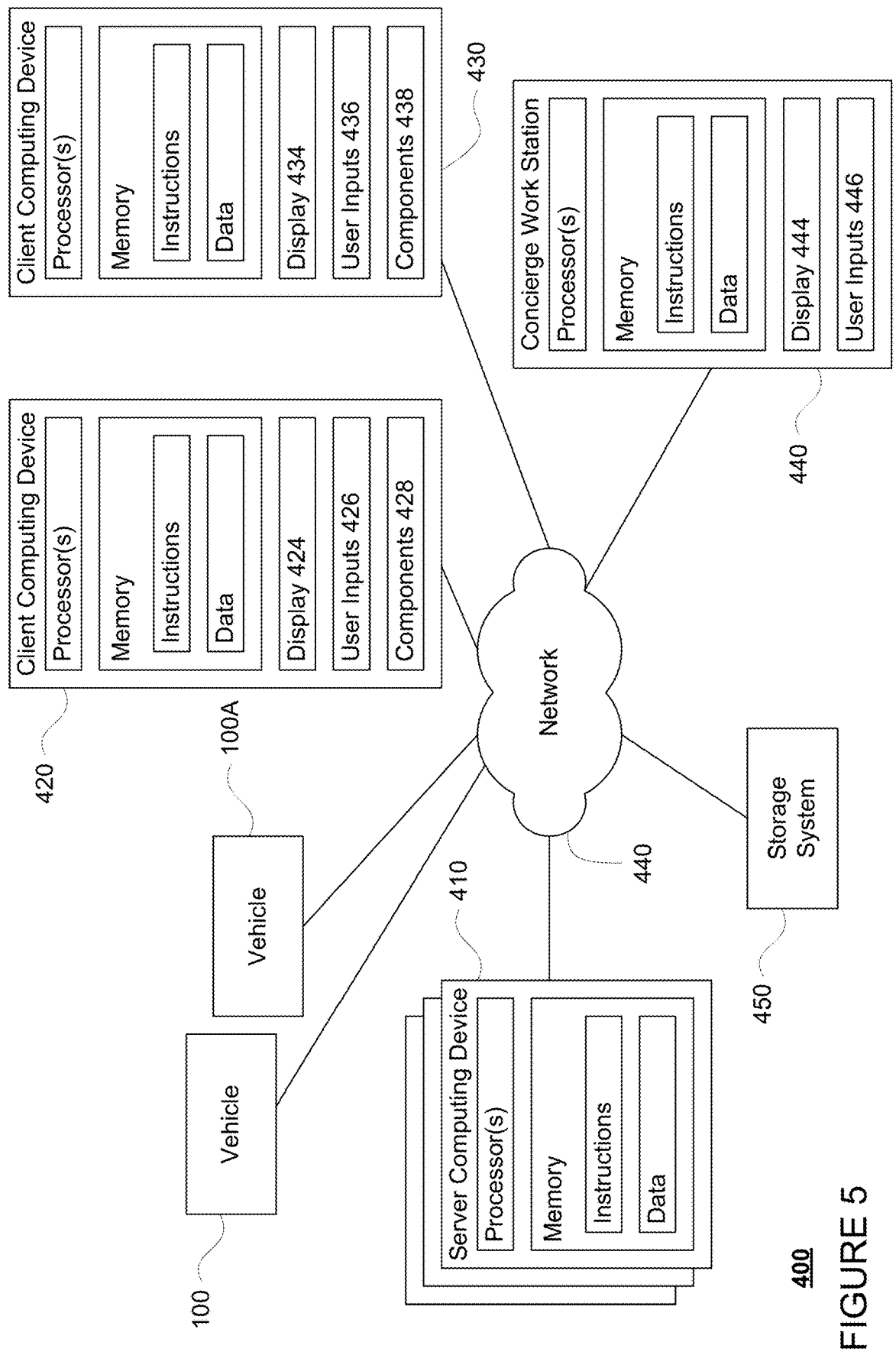
FIG. 5 is a functional diagram of the system of FIG. 4 in accordance with aspects of the disclosure.

The one or more computing devices 110 of vehicle 100 may also receive or transfer information to and from other computing devices. FIGS. 4 and 5 are pictorial and functional diagrams, respectively, of an example system 400 that includes a plurality of computing devices 410, 420, 430, 440 and a storage system 450 connected via a network 440. System 400 also includes vehicle 100, and vehicle 100A which may be configured similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 440, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include a server having a plurality of computing devices, e.g., a load balanced server farm, that exchange information with different nodes of a network for the purpose of receiving, processing and transmitting the data to and from other computing devices. For instance, one or more computing devices 210 may include one or more server computing devices that are capable of communicating with one or more computing devices 110 of vehicle 100 or a similar computing device of vehicle 100A as well as client computing devices 420, 430, 440 via the network 440. For example, vehicles 100 and 100A may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

In addition, server computing devices 410 may use network 440 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 5, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touch-screen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a head-mounted computing system in FIG. 5. As an example the user may input information using a small keyboard, a keypad, microphone, using visual signals with a camera, or a touch screen.

In some examples, client computing device 440 may be a concierge work station used by an administrator to provide concierge services to users such as users 422 and 432. For example, a concierge 442 may use the concierge work station 440 to communicate via a telephone call or audio connection with users through their respective client computing devices or vehicles 100 or 100A in order to ensure the safe operation of vehicles 100 and 100A and the safety of the users as described in further detail below. Although only a single concierge work station 440 is shown in FIGS. 4 and 5, any number of such work stations may be included in a typical system.

Storage system 450 may store various types of information as described in more detail below. This information may be retrieved or otherwise accessed by a server computing device, such as one or more server computing devices 410, in order to perform some or all of the features described herein. For example, the information may include user account information such as credentials (e.g., a user name and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), as well as one or more unique signals for the user.

The storage system 450 may also store routing data for generating and evaluating routes between locations. For example, the routing information may be used to estimate how long it would take a vehicle at a first location to reach a second location. In this regard, the routing information may include map information, not necessarily as particular as the detailed map information described above, but including roads, as well as information about those road such as direction (one way, two way, etc.), orientation (North, South, etc.), speed limits, as well as traffic information identifying expected traffic conditions, etc.

The storage system 150 may also store information which can be provided to client computing devices for display to a user. For instance, the storage system 150 may store predetermined distance information for determining an area at which a vehicle is likely to stop for a given pickup or destination location. The storage system 150 may also store graphics, icons, and other items which may be displayed to a user as discussed below.

As with memory 130, storage system 250 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 440 as shown in FIG. 4 and/or may be directly connected to or incorporated into any of the computing devices 110, 410, 420, 430, 440, etc.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

In one aspect, a user may download an application for requesting a vehicle to a client computing device. For example, users 122 and 132 may download the application via a link in an email, directly from a website, or an application store to client computing devices 120 and 130.

For example, client computing device may transmit a request for the application over the network, for example, to one or more server computing devices 110, and in response, receive the application. The application may be installed locally at the client computing device.

The user may then use his or her client computing device to access the application and request a vehicle. As an example, a user such as user 132 may use client computing device 130 to send a request to one or more server computing devices 110 for a vehicle. As part of this, the user may identify a pickup location, a destination location, and, in some cases, one or more intermediate stopping locations anywhere within a service area where a vehicle can stop.

Figures 6A, 6B, 6C:
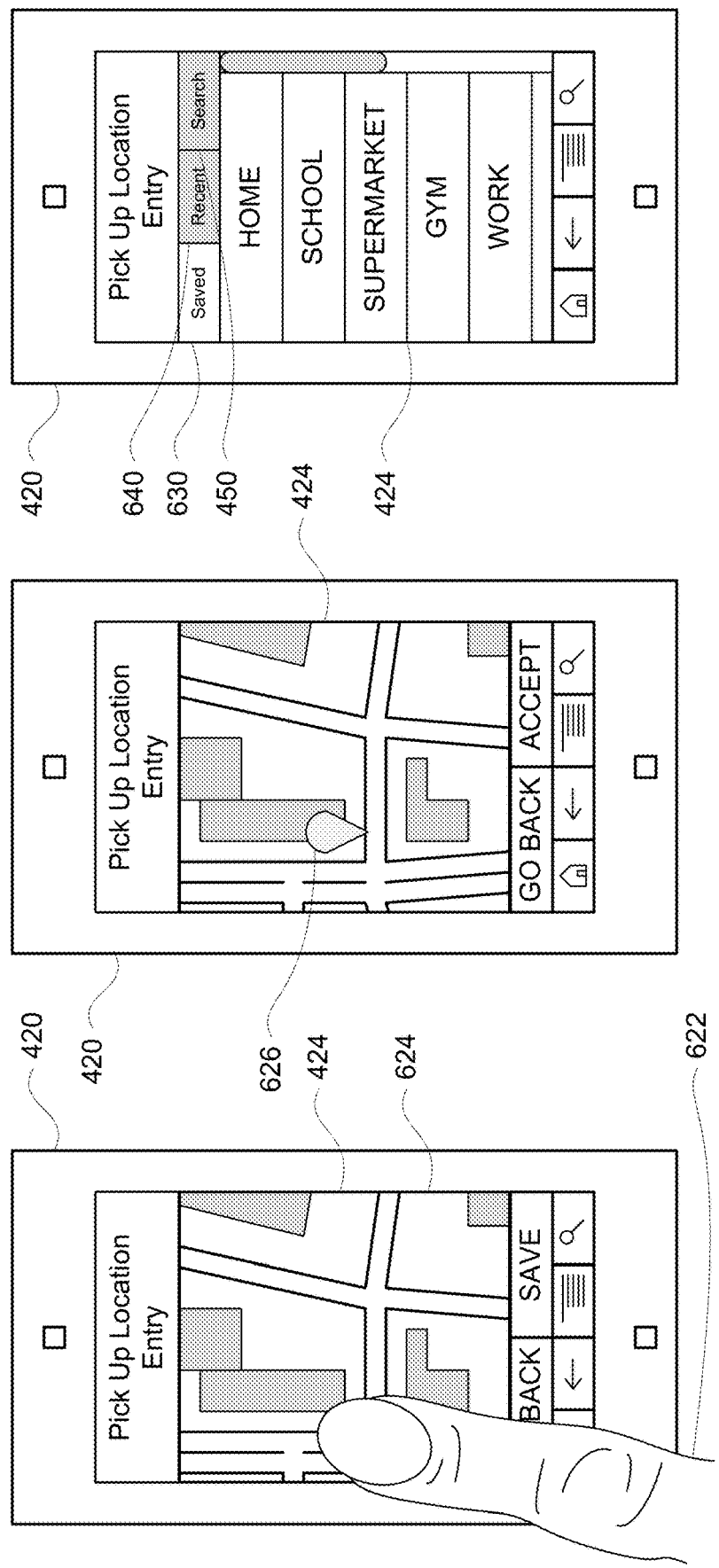

These pickup and destination locations may be predefined (e.g., specific areas of a parking lot, etc.) or may simply be any location within a service area of the vehicles. As an example, a pickup location can be defaulted to current location of the user's client computing device, or can be input by the user at the user's client device. For instance, the user may enter an address or other location information or select a location on a map to select a pickup location. As shown in FIG. 6A, user 422 may use his or her finger 622 to tap on a map 624 displayed on the display 424 of client computing device 420. In response, as shown in FIG. 6B, the location of the tap on the map, displayed as map marker 626, may be identified as a requested location. Allowing the user to input or select a location may be especially helpful where the user is not currently located at the pickup location but will be by the time the vehicle arrives.

In the example of FIG. 6C, a user is provided with a plurality of options for inputting locations. As shown, the user is able to select from a series of saved locations under a saved option 630 previously saved by the user as discussed above. The user may also be provided with option 640 which provide the user with the ability to view a list of recent locations. By selecting option 650, the user may be able to conduct a location search. For example, a user may enter a search query ("fast food restaurant" or "doctor doe" or "gas station near me") and receive a set of locations corresponding to the search query as with a typical map or location-based search engine.

Once the user has selected one or more of a pickup and/or destination locations, the client computing device 420 may send the location or locations to one or more server computing devices of the centralized dispatching system. In response, one or more server computing devices, such as server computing device 110, may select a vehicle, for instance based on availability and proximity to the user. The server computing device may then dispatch the selected vehicle to pickup to the user by providing the vehicle with the pickup and/or destination locations specified by the user.

When a vehicle, such as vehicle 101, is dispatched to the user, the client computing device 420 can show information about where the pickup location will be. This information may be provided to the client computing device from the server computing device 110. For example, the server computing device 110 may access the information of storage system 150 in order to identify a map and determine a route along the map between the vehicle's current location and the pickup location. This information, along with a potential pickup area or zone, may then be provided to the client computing device for display to a user.

Figure 7:
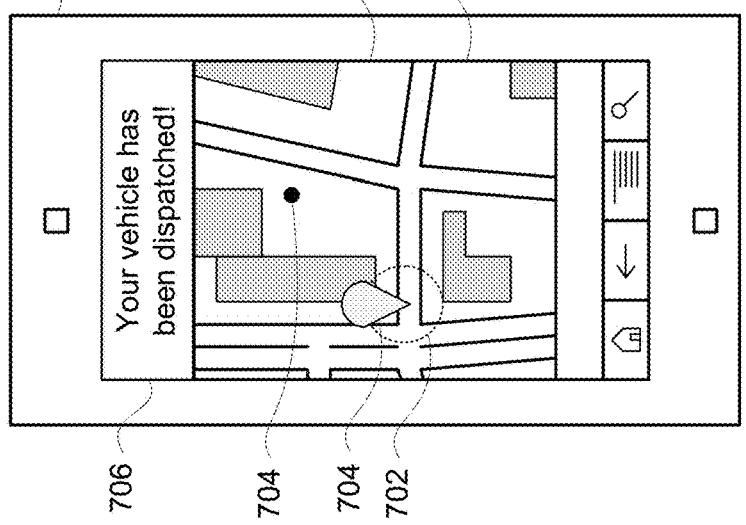

Once received by the client computing device, the information may be displayed as shown in FIG. 7. For instance, client computing device 120 displays a map 724 (corresponding to map 624) identifying a potential pickup zone 702 around the pickup location identified by marker 704. In addition to the map and potential pickup zone 702, the client computing device may also display a marker 706 indicating the current location of the client computing device. The current location of the client computing device may be determined using various methods such including GPS and/or other location services at the passenger's client computing device.

Figure 8:
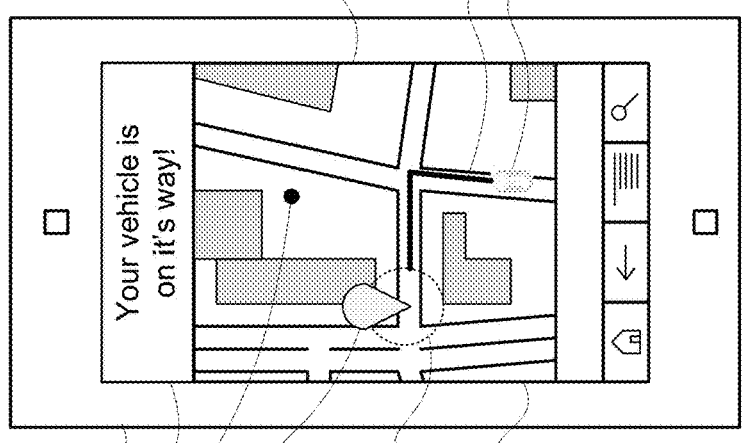

As noted above, information about the vehicle's status may be shared with a potential passenger, or simply passenger. This may include, for instance, displaying the vehicle's up to date location and route to the passenger on the map so that the passenger can plan ahead how he or she will meet the vehicle. For instance, a passenger viewing the displayed map may be able to readily recognize whether he or she needs to cross the street, or move to where the car is likely to find parking along the route. As shown in FIG. 8, marker 802 identifies the current location of the vehicle 101. In this example, the route the vehicle is currently taking towards the potential pickup zone 702 is also identified by path 804.

In addition, the passenger can be provided with narrative updates about what the vehicle is currently doing. For instance, as shown in FIGS. 7 and 8, narrative updates 706 and 806 are displayed which indicate the status of the vehicle as being dispatched and on the way to pick up the passenger. Other examples of narrative updates may include such as "Looking for a spot to pull over . . . ", "Found a spot to pull over", "Can't find a spot, circling around the block . . . ", etc.

At the same time, information about the passenger's location may be reported to the vehicle. For example, the location determined using GPS and/or other location services at the passenger's client computing device may be sent directly (or indirectly by way of a dispatching server computing device) to the vehicle.

Because of this exchange of information, the vehicle and/or passenger may attempt or initiate a fly-by pickup. As noted above, during a fly-by pickup, rather than pulling into a parking area and waiting for the passenger, the vehicle may simply double park, for instance, stopping in a lane when safe to do so and waiting only a few seconds for the passenger to get into the car, close the door and fasten his or her seatbelt. If this occurs, the fly-by pickup has been successful. If not, the vehicle may have to pull away and continue towards the original pickup location. In some cases, the vehicle and passenger may need to rearrange a new pickup location after an unsuccessful fly-by pickup attempt.

Before actually attempting a fly-by pickup, in addition to the current location of the passenger's client computing device, the vehicle's computing devices may take into consideration current traffic conditions, such as whether it is a busy or quiet street and how disruptive a fly-by pickup might be. This may include processing real time data from sensors of the vehicle as well as querying the map information of the navigation system 168 for historical information to determine how safe a street/location is (or is expected to be) for pulling over. Of course, because a fly-by pickup does not involve stopping and waiting for the passenger for long periods (more than a few seconds), the vehicle may be able to do a fly-by pickup even on streets where the vehicle would normally not be able to stop or pick up a passenger.

Figure 9:
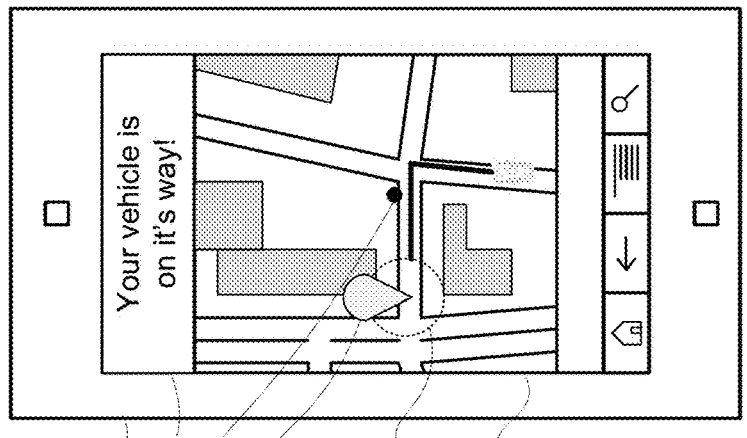

Once the vehicle's computing devices have determined that a fly-by pickup is safe given the current and expected (historical) conditions, the vehicle may initiate a fly-by pickup. When initiated by a vehicle, the fly-by pickup may occur automatically. In this regard, if the passenger's reported location indicates that the passenger is already waiting at a particular spot such as by a curb and therefore likely ready to go, the vehicle can stop at that location. For instance, as shown in FIG. 9, the marker 706, representing the current location of the client computing device 420 (and presumably also the current location of user 422), indicates that the passenger is very close to a curb and may be ready to be pickup up. As this information is shared directly with the vehicle's computing devices 110, the vehicle may use this information to initiate a fly-by pickup. At the same time, the vehicle's computing devices may send a notification to the client computing device (either directly or via server computing devices 410) indicating that the vehicle is attempting an fly-by pickup. The notification may be displayed on the display of the client computing device in order to let the passenger know that the vehicle is attempting the fly-by pickup.

Alternatively, rather than initiating the fly-by pickup automatically, the vehicle's computing devices may use the indication as a basis to ask the user if he or she is interested in a fly-by-pick-up in real time. In this regard, the vehicle's computing devices 110 may send a request to the client computing device 420 to query whether the passenger is interested in a fly-by pickup. At the client computing device 420, this may be achieved as shown in FIG. 10 by displaying a popup notification 1002 with options 1004 and 1006 for the user to select to accept ("YES" option 1004) or deny ("NO" option 1006) the request to do the fly-by pickup. Of course, such notifications should only be used once or twice for any given pickup in order to avoid cluttering the screen of the client computing device and discouraging passengers to attempt fly-by pickups. In this example, narrative update 1108 provides further details on why the vehicle's computing devices are requesting a fly-by pickup, again to provide information about the status of the vehicle. Again, once confirmed by the user, the vehicle's computing devices may send a notification to the client computing device (either directly or via server computing devices 410) indicating that the vehicle is attempting an fly-by pickup. The notification may be displayed on the display of the client computing device in order to let the passenger know that the vehicle is attempting the fly-by pickup.

In some examples, the fly-by pickup notification can be made using visual representations of the relationship between the vehicle and the location of the passenger's client computing device. For instance, as shown in FIG. 11, the location of the vehicle and the passenger's client computing device may be represented by bubbles 1102 and 1104, respectively. As the passenger's client computing device and the vehicle approach one another, the bubbles will move towards one another. Once the bubbles "meet" as shown in FIG. 12, the display may change, for instance, by flashing once or twice and displaying the notification (as shown in FIG. 10) asking if the passenger wants to attempt a fly-by pickup. Again, once confirmed by the user, the vehicle's computing devices may send a notification to the client computing device (either directly or via server computing devices 410) indicating that the vehicle is attempting an fly-by pickup. The notification may be displayed on the display of the client computing device in order to let the passenger know that the vehicle is attempting the fly-by pickup.

In some instances, the fly-by pickup may be initiated by the passenger. For instance, as indicated above, the passenger may be able to view the current location of the vehicle relative to his or her location (or rather the location of the passenger's client computing device) via a map displayed on the passenger's client computing device. This can give the passenger a clear indication of when a fly-by pickup is possible and even encourage him or her to initiate fly-by pickups as discussed below.

In one example, the user may also signal physically to the vehicle that he or she is interested in a fly-by pickup by physically stepping into the street. In this example, the vehicle's perception system 172 may detect the downward motion of the passenger stepping into the street, and the computing devices 110 may use this information to determine that the passenger is interested in a fly-by pickup. At this point, the passenger may be prompted (if the fly-by pickup is determined to be safe given the current and expected (historical) conditions as noted above) as shown in FIG. 10 and a confirmation notification displayed to the user indicating that the vehicle is attempting a fly-by pickup. Alternatively, rather than requesting confirmation from the user, the client computing device may display the notification that the vehicle is attempting a fly-by pickup and the vehicle may simply stop at a location proximate to the passenger.

Alternatively, the passenger may initiate a fly-by pickup using his or her client computing device. For instance, the passenger may tap or double tap on a map to pick an alternative pickup location as shown in FIGS. 13 and 14. For instance, in FIG. 13, user 422's finger 622 double taps on the display. In response, a marker 1402 appears indicating the location of one of the first or second taps. The geographic location of the marker relative to the map 724 is sent to the vehicle's computing device 110 (directly or indirectly via the server computing devices 410). While this is occurring, the narrative update 1406 may be displayed to indicate that the client computing device is checking with the vehicle's computing devices 110 to confirm that the fly-by pickup can and/or will be attempted. Again, at this point, the passenger may be prompted (if the fly-by pickup is determined to be safe given the current and expected (historical) conditions as noted above) as shown in FIG. 10 and a confirmation notification displayed to the user indicating that the vehicle is attempting a fly-by pickup. Alternatively, rather than requesting confirmation from the user, the client computing device may display the notification that the vehicle is attempting a fly-by pickup and the vehicle may simply stop at a location proximate to the passenger.

In another example, the passenger may drag a marker representing the current pickup location to another point on the map, or draw a line on the map from his or her current location towards a street in order to signal path that the user is going to take. As can be seen between the examples of FIGS. 8 and 14, marker 704 of FIG. 8 has been dragged across the display 422 to a new position in FIG. 14. The geographic location of the new position may be sent to the vehicle's computing devices 110 and at the same time, the narrative update 1406 may be displayed. Again, the passenger may be prompted (if the fly-by pickup is determined to be safe given the current and expected (historical) conditions as noted above) as shown in FIG. 10 and a confirmation notification displayed to the user indicating that the vehicle is attempting a fly-by pickup. Alternatively, rather than requesting confirmation from the user, the client computing device may display the notification that the vehicle is attempting a fly-by pickup and the vehicle may simply stop at a location proximate to the passenger.

Once the vehicle is attempting the fly-by pickup, in order to achieve the fly-by pickup, the passenger may be asked to perform some task to further facilitate the fly-by pickup.

This may include a special gesture, which the vehicle's computing devices could detect either from the laser, camera, the passenger's client computing device, or some combination of the above. In another example, the passenger may be asked to take a selfie so vehicle's computing devices can recognize him or her, or to take a picture or video of the area near the passenger (e.g. buildings, vegetation, etc.) so the vehicle can recognize the exact location of the passenger. In yet another example, the passenger may be asked to hold his or her client computing device out while the device's screen flashes or a flash is lit in order to allow the vehicle's computing devices to identify the passenger's exact location visually. Similarly, the passenger's client computing device may play a particular sound which a microphone on the vehicle captures and is used to determine the location of the passenger. In addition or alternatively, the passenger may be asked to walk towards the vehicle, such as into the road in front of the vehicle.

These tasks may also include asking the passenger to provide verbal cues. For instance, the passenger may speak while an external microphone on the vehicle picks up the sound and matches the sound to a signal received at the microphone on the user's client computing device. In another example, the passenger may provide a verbal description of his or herself so that the vehicle's computing devices can recognize the passenger. In yet another example, if the vehicle determines that it is unable to pull over where the passenger is standing, the vehicle can open a window and slow down while the passenger speaks instructions into the cabin of the vehicle.

For passengers with visual impairments, the vehicle may provide audible cues to assist the passenger and the vehicle in achieving a fly-by pickup. For instance, the vehicle could make (by playing through a speaker) or send audio ques to the passenger's client computing device such as a specific beeping sound to guide or lead the passenger towards the vehicle. If the vehicle's perception system is able to localize the passenger very well, the vehicle's computing devices may provide more specific audible instructions to the client computing device to be played to the user such as "walk to your right along the sidewalk for 23 feet; then, step off the curb to your vehicle, which is parked 3 feet into the road."

In other examples, the vehicle's computing devices may send the passenger's client computing device a picture. This picture may have been captured by a camera of the vehicle's perception system 172. The picture may be displayed on the user's client computing device with a notification indicating to the passenger that the vehicle has identified him or her as being nearby. In some instances, the notification may include a request for the passenger to confirm whether the vehicle has identified the correct person. For example, as shown in FIG. 15, image 1502 of people 1504, 1508 is displayed on the display 424 with narrative update 1506 indicating the vehicle has captured an image which may include user 422. The narrative update also requests that the user tap on the image of his or herself to confirm that the user is actually included in the image and which of people 1504, 1508 is the user 422. The picture may be sent as part of the notification/request to achieve the fly-by pickup or as part of the typical process for picking up a passenger.

To further determine whether a passenger is ready for a fly-by pickup, the passenger's client computing device may send information to the vehicle's computing device about whether the client computing device is currently moving. Movement information may be provided by an accelerometer and/or gyroscope of the client computing device. This alone or combined with information from the vehicle's camera may indicate whether the passenger is currently walking or standing. In that regard, if a passenger is standing, he or she may be more interested in being pickup at the original pickup location. If walking, he or she may be more interested in a fly-by pickup. Of course, the reverse may also be considered true in certain circumstances.

In addition to considering the current location of the passenger's client computing device and current and expected conditions, the vehicle's computing devices may also consider the passenger's past history with attempting and achieving fly-by pickups. For instance, if the passenger has little or no history of attempts, the vehicle's computing devices may be more willing to attempt a fly-by pickup than if the same passenger has a history of failing to meet the vehicle after accepting or requesting a fly-by pickup. Of course, if a passenger has a history of being successful at achieving fly-by pickups, the passenger may be more likely to receive notifications to attempt a fly-by pickup. Similarly, for a passenger who is more successful at achieving fly-by pickups, the vehicle's computing device may attempt riskier fly-by pickups than for someone who has not attempted a fly-by pickup or has been unsuccessful in the past.

In some cases, the passenger may be offered discounts, free rides, or other perks in exchange for accepting or initiating a fly-by pickup. This may also be dependent upon whether the fly-by pickup was successful (and the passenger made it into the vehicle).

Figure 16:
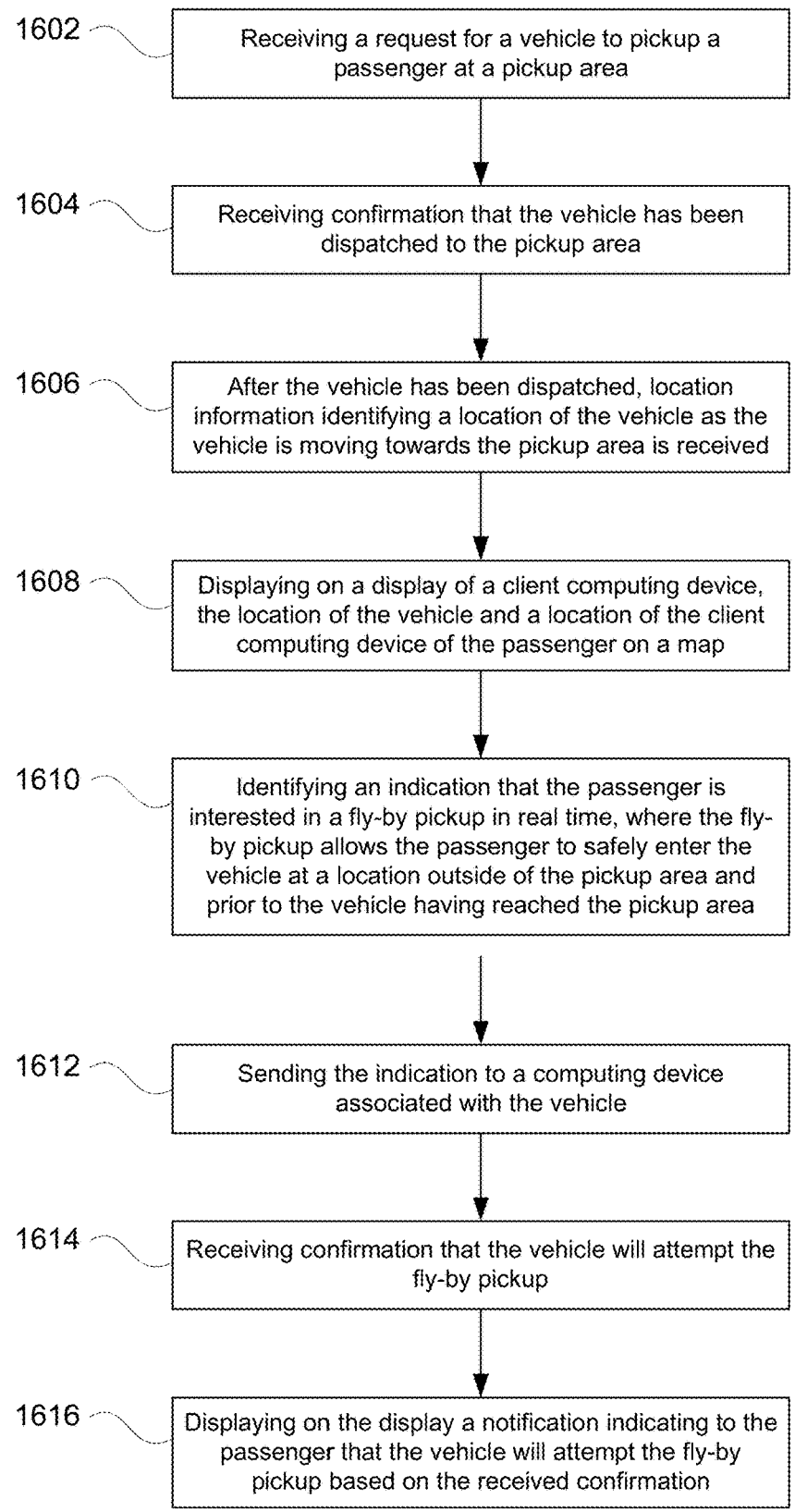
FIG. 16 is an example flow diagram in accordance with aspects of the disclosure.

FIG. 16 is an example flow diagram 1600 in accordance with some of the aspects described above that may be performed by one or more computing devices such as client computing device 120. For example, at block 1602, a request for a driverless vehicle to pick up a passenger at a pickup area is received. Confirmation that the vehicle has been dispatched to the pickup area is received at block 1604. After the vehicle has been dispatched, location information identifying a location of the vehicle as the vehicle is moving towards the pickup area is received at block 1606. The location of the vehicle and a location of a client computing device of the passenger are displayed on a map on a display of the client computing device at block 1608. An indication that the passenger is interested in a fly-by pickup in real time is identified at block 1610. The fly-by pickup allows the passenger to safely enter the vehicle at a location outside of the pickup area and prior to the vehicle having reached the predetermined pickup area. The indication is sent to a computing device associated with the vehicle at block 1612. Confirmation that the vehicle will attempt the fly-by pickup is received at block 1614. A notification indicating to the passenger that the vehicle will attempt the fly-by pickup is displayed on the display based on the received confirmation at block 1616.

Figure 17:
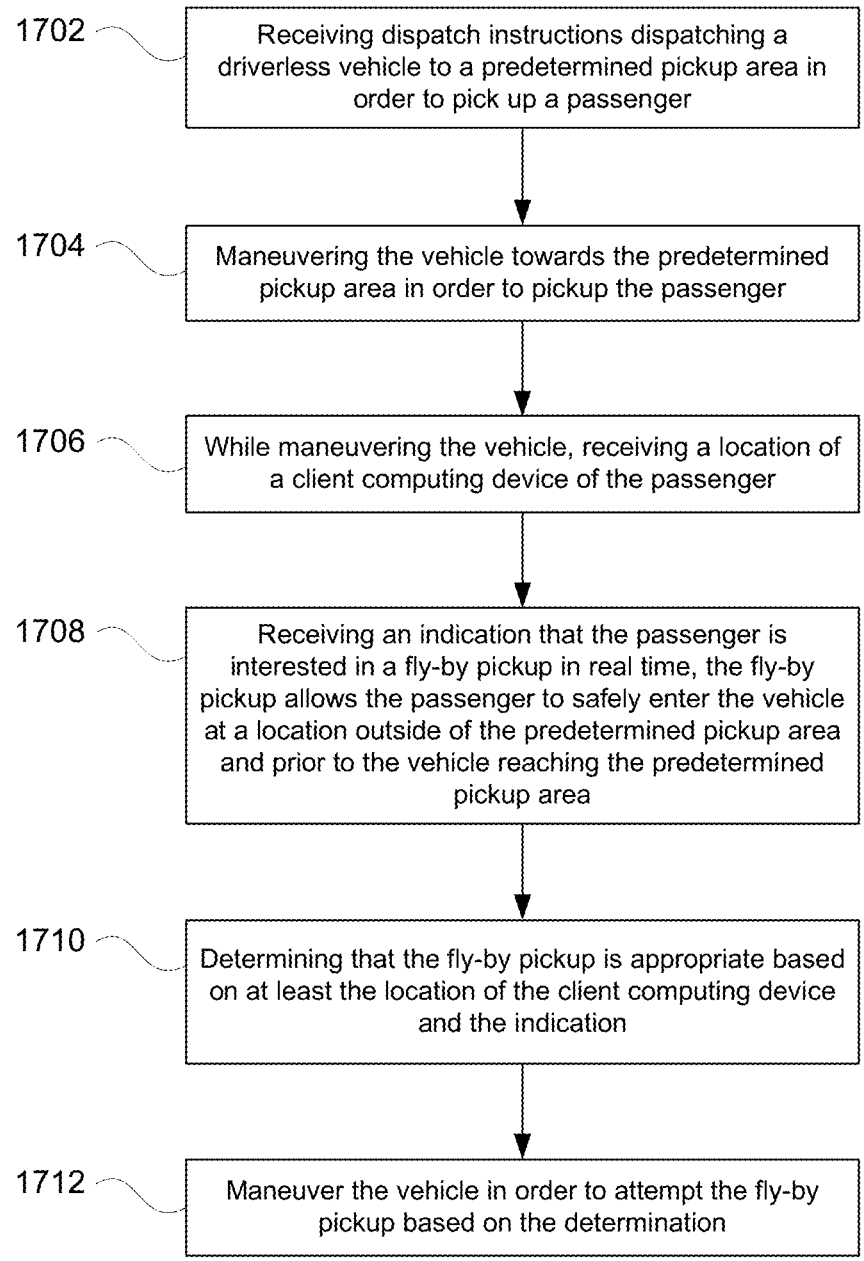
FIG. 17 is another example flow diagram in accordance with aspects of the disclosure.

FIG. 17 is an example flow diagram 1700 in accordance with some of the aspects described above that may be performed by one or more computing devices such as vehicle computing devices 110. For example, at block 1702, dispatch instructions dispatching a driverless vehicle to a predetermined pickup area in order to pick up a passenger are received. The vehicle is maneuvered towards the predetermined pickup area to pick up the passenger at block 1704. While maneuvering the vehicle, a location of a client computing device of the passenger is received at block 1706. An indication that the passenger is interested in a fly-by pickup in real time is received at block 1706. The fly-by pickup allows the passenger to safely enter the vehicle at a location outside of the predetermined pickup area and prior to vehicle reaching the predetermined pickup area at block 1708. The fly-by pickup is determined to be appropriate based on at least the location of the client computing device and the indication at block 1710. The vehicle is further maneuvered in order to attempt the fly-by pickup based on the determination at block 1712.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for arranging a pickup between a driverless vehicle and a passenger, the method comprising:
   receiving, by one or more processors of the vehicle, dispatch instructions dispatching the vehicle to a predetermined pickup location in order to pick up the passenger;
   maneuvering, by the one or more processors, the vehicle towards the predetermined pickup location;
   while maneuvering the vehicle along a route towards the predetermined pickup location:
      receiving, by the one or more processors via a network, location information from a client computing device associated with the passenger, the location information identifying a location of the client computing device determined at the client computing device; and
      determining, by the one or more processors, a new pickup location for the passenger based on the received location information and whether the vehicle will reach the new pickup location before reaching the predetermined pickup location; and
   maneuvering the vehicle, by the one or more processors, to the new pickup location in order to attempt to pick up the passenger.

2. The method of claim 1, wherein the determining, by the one or more processors, the new pickup location is further based on current driving conditions associated with the new pickup location.

3. The method of claim 2, wherein the current driving conditions indicate whether the pickup location is on a busy street.

4. The method of claim 2, wherein the current driving conditions indicate whether the vehicle picking up the passenger at the new pickup location would be disruptive to other road users.

5. The method of claim 1, wherein the determining, by the one or more processors, the new pickup location is further based on historical driving conditions associated with the new pickup location.

6. The method of claim 1, wherein the determining, by the one or more processors, the new pickup location is further based on whether the passenger is already waiting at a particular spot.

7. The method of claim 6, wherein the particular spot is by a curb.

8. The method of claim 1, wherein the determining, by the one or more processors, the new pickup location is further based on the passenger's prior history of success meeting vehicles outside of predetermined pickup location.

9. The method of claim 1, further comprising providing, by the one or more processors, a notification to the client computing device indicating that the vehicle is proceeding to the new pickup location.

10. The method of claim 1, further comprising:
   sending, by the one or more processors, a notification to the client computing device requesting a confirmation that the passenger would like to use the new pickup location; and
   in response to the notification, receiving, by the one or more processors, the confirmation that the passenger would like to use the new pickup location, wherein the vehicle is maneuvered to the new pickup location in response to receiving the confirmation.

11. A system for arranging a pickup between a driverless vehicle and a passenger, the system comprising a vehicle having one or more processors configured to:
   receive dispatch instructions dispatching the vehicle to a predetermined pickup location in order to pick up the passenger;
   maneuver the vehicle towards the predetermined pickup location;
   while maneuvering the vehicle along a route towards the predetermined pickup location:
      receive, via a network, location information from a client computing device associated with the passenger, the location information identifying a location of the client computing device determined at the client computing device; and
      determine a new pickup location for the passenger based on the received location information and whether the vehicle will reach the new pickup location before reaching the predetermined pickup location; and
   maneuver the vehicle to the new pickup location in order to attempt to pick up the passenger.

12. The system of claim 11, wherein the one or more processors are configured to determine the new pickup location further based on current driving conditions associated with the new pickup location.

13. The system of claim 12, wherein the current driving conditions indicate whether the pickup location is on a busy street.

14. The system of claim 12, wherein the current driving conditions indicate whether the vehicle picking up the passenger at the new pickup location would be disruptive to other road users.

15. The system of claim 11, wherein the one or more processors are configured to determine the new pickup location further based on whether the passenger is already waiting at a particular spot.

16. The system of claim 15, wherein the particular spot is by a curb.

17. The system of claim 11, wherein the one or more processors are configured to determine the new pickup location further based on the passenger's prior history of success meeting vehicles outside of predetermined pickup location.

18. The system of claim 11, wherein the one or more processors are configured to provide a notification to the client computing device indicating that the vehicle is proceeding to the new pickup location.

19. The system of claim 11, wherein the one or more processors are configured to:
    send a notification to the client computing device requesting a confirmation that the passenger would like to use the new pickup location; and
    in response to the notification, receive the confirmation that the passenger would like to use the new pickup location, wherein the vehicle is maneuvered to the new pickup location in response to receiving the confirmation.

\* \* \* \* \*